United States Patent [19]

Leveque

[11] Patent Number: 4,907,217
[45] Date of Patent: Mar. 6, 1990

[54] SYSTEM AND METHOD OF TRANSMITTING A COMPLEX WAVEFORM OVER A COMMUNICATION CHANNEL UTILIZING LINCOMPEX TECHNIQUES

[75] Inventor: James H. Leveque, Ellicott City, Md.

[73] Assignee: AMAF Industries, Inc., Columbia, Md.

[21] Appl. No.: 242,904

[22] Filed: Sep. 12, 1988

[51] Int. Cl.$^4$ .............................................. H04J 15/00
[52] U.S. Cl. ........................................ 370/7; 370/70; 455/72
[58] Field of Search ................. 370/7, 109, 118, 70; 375/111, 122; 381/29, 30, 31; 455/72, 71; 358/133

[56] References Cited

U.S. PATENT DOCUMENTS

| | | | |
|---|---|---|---|
| 3,794,919 | 2/1974 | Villeret et al. | 455/72 |
| 4,044,205 | 8/1977 | Mullarkey | 455/72 |
| 4,047,108 | 9/1977 | Bijker et al. | 455/72 |
| 4,271,499 | 6/1981 | Leveque | 370/7 |
| 4,490,691 | 12/1984 | Dolby | 455/72 |

Primary Examiner—Joseph A. Orsino
Assistant Examiner—Frank M. Scutch, III
Attorney, Agent, or Firm—Birch, Stewart, Kolasch & Birch

[57] ABSTRACT

Complex waveforms may be transmitted using Lincompex techniques by frequency shifting either the complex waveform, its envelope, or both, in order to ensure that the compressed complex waveform and the envelope signal are transmitted without any substantial overlap therebetween utilizing Lincompex techniques. Overlap between the compressed waveform and envelope prevents the proper demodulation of the complex waveform from the signal transmitted. Accordingly, the frequency shifting techniques utilized in the present application allow Lincompex techniques to be utilized with complex waveforms having both a large bandwidth and a large envelope bandwidth, for example, the waveforms generated by parallel tone or multi-tone digital data.

56 Claims, 5 Drawing Sheets

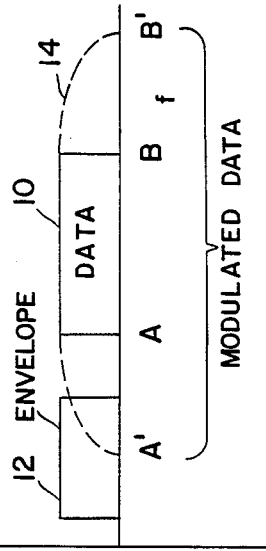
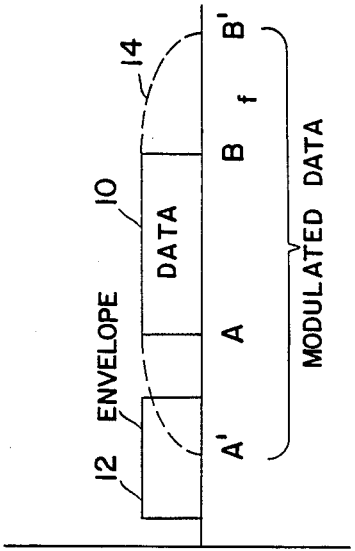
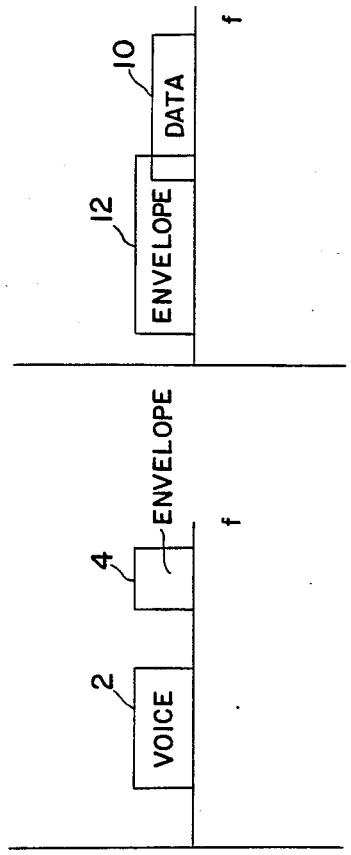
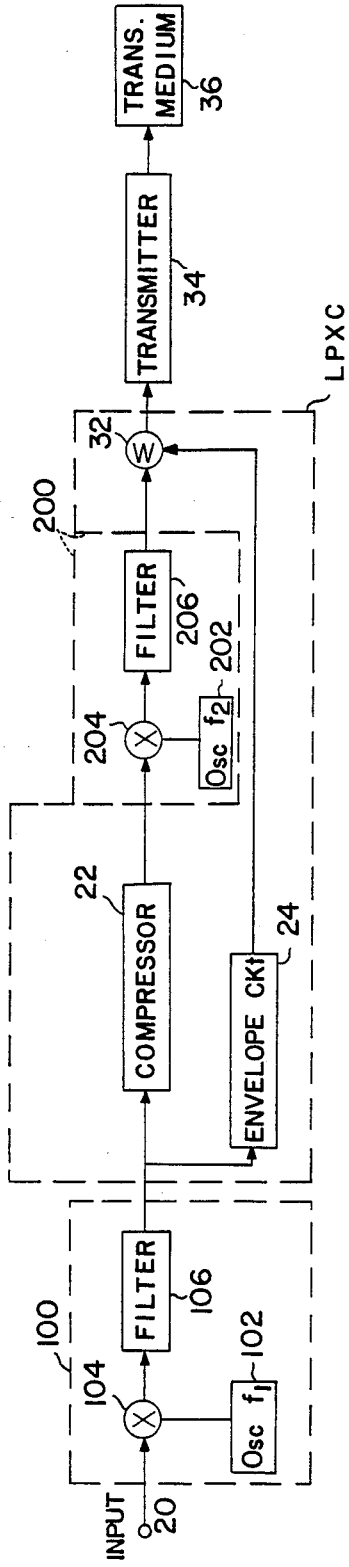
FIG. 2(a)
FIG. 2(b)
FIG. 3
FIG. 5

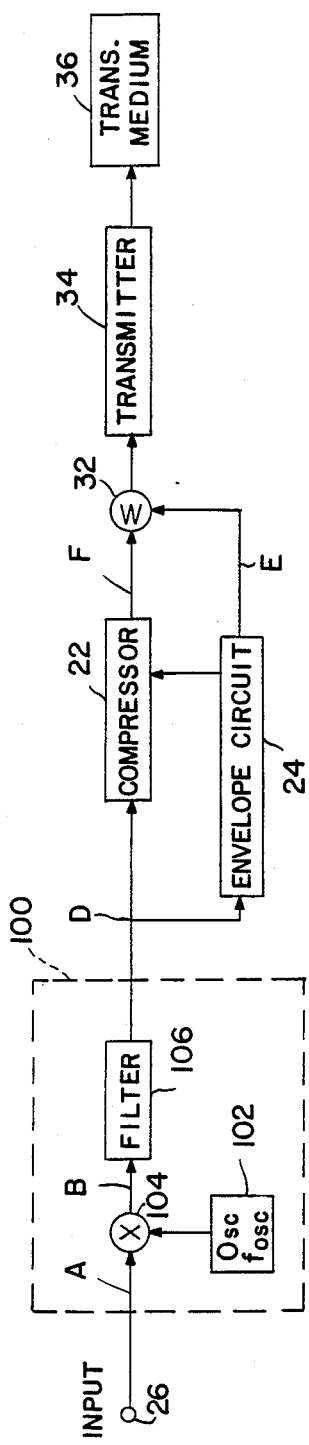
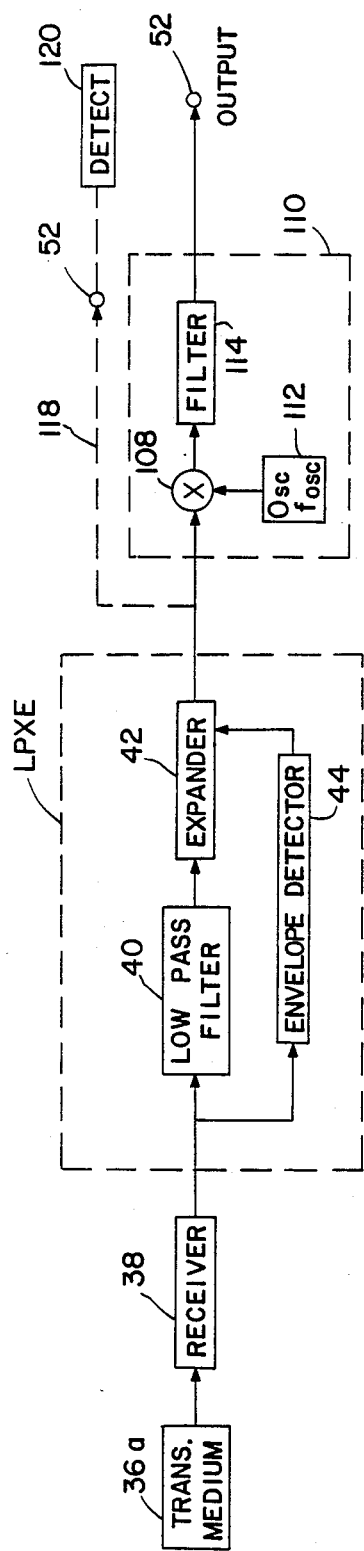
FIG. 4(a)
FIG. 4(b)

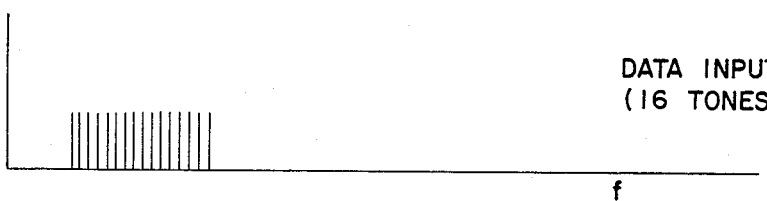
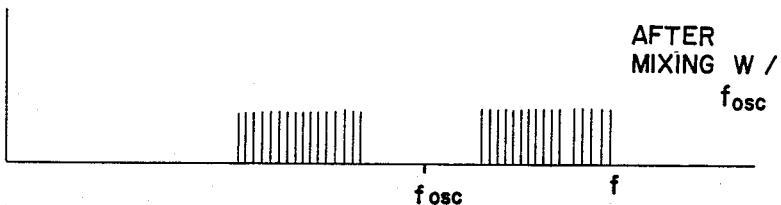
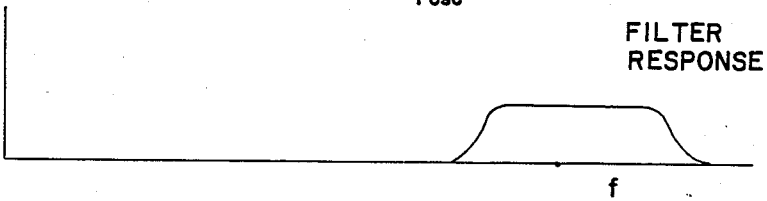
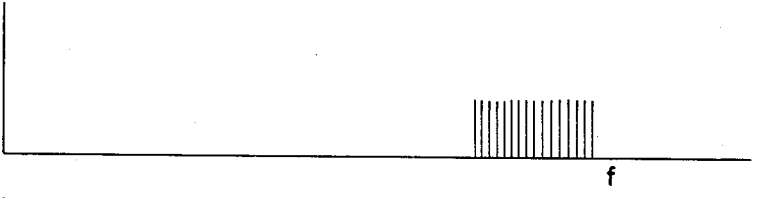
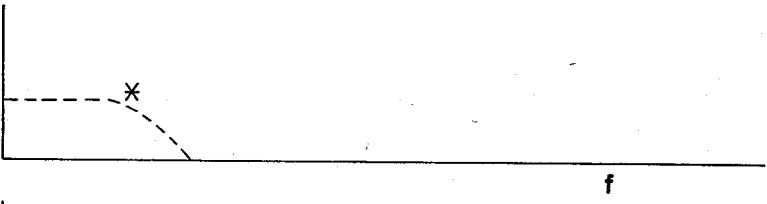
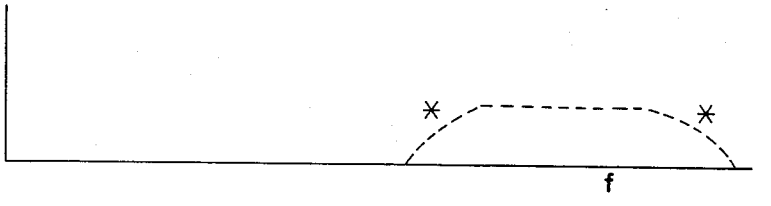
BANDWIDTH CHOSEN DEPENDS ON VARYING FACTORS INCLUDING ACCURACY OF COMPRESSION / EXPANSION DESIRED

SYSTEM AND METHOD OF TRANSMITTING A COMPLEX WAVEFORM OVER A COMMUNICATION CHANNEL UTILIZING LINCOMPEX TECHNIQUES

FIELD OF THE INVENTION

The present invention relates to telecommunications systems in general, and more particularly relates to the transmission of any complex waveform such as that generated by parallel-tone or multi-tone digital data over a linked compressor-expander circuit (Lincompex).

BACKGROUND OF THE INVENTION

Linked compressor and expander (Lincompex) systems are known in the telecommunications arts. These systems were originally implemented with analog technology but may now be implemented digitally such as taught in U.S. Pat. No. 4,271,499 to Leveque, the inventor of the present application. In the past, such Lincompex systems have been generally utilized only to transmit audible speech. While the Leveque '499 patent does disclose the possibility of transmitting data between speech syllables to optimize transmitter loading in such a system primarily intended for transmission of speech the system proposed for transmission of data in the '499 Leveque patent does not transmit the data through the Lincompex compressor and expander and thus does not derive the benefits of Lincompex for the data.

Known Lincompex systems such as that taught by the '499 Leveque patent may transmit voice using Lincompex techniques as the voice signal is band limited and exhibits an envelope which is also band limited and does not overlap the voice band. Referring to FIG. 2(a), a typical voice frequency band 2 is illustrated. Normal voice is band limited between 300 and 2700 hertz and has an envelope which exhibits an envelope signal frequency band 4 of considerably less than 300 hertz. Normally, the envelope for voice exhibits a frequency band from 0 to 90 Hz and the envelope signal, when modulated according to the teachings of the '499 patent, has a center frequency of 2900 Hz. While Lincompex systems such as that disclosed in the '499 Leveque patent excel in situations such as that illustrated in FIG. 2(a) where the envelope and voice bands do not overlap, the Lincompex systems utilized in the past as exemplified by the '499 Leveque patent were not heretofore useable to transmit data where the data band, when modulated, and the envelope signal band overlap.

The data signal band and its envelope band will often overlap where a high peak/average signal is utilized, particularly where random signal content is encountered. A good example of such a high peak/average signal is so-called "parallel-tone" or "multi-tone data" which is often utilized to transmit data across radio links or other communication channels. Such parallel-tone or multi-tone data utilizes a plurality of tones which may be modulated by one of several different types of data modulation such as amplitude shift keying (ASK), frequency shift keying (FSK), phase-shift keying (PSK), phase modulation (PM), frequency modulation (FM), or the like. Assuming a transmitter has a maximum power $P_{max}$, and assuming a n-tone, parallel-tone or multi-tone system is utilized, then the average power per tone is shown by the equation:

$$P_{tone} = P_{max}/n^2$$

Therefore, in a 16 tone system when $P_{max}$ equals 1000 watts, $P_{tone}$ equals 1000/256 or about 4 watts. The average power per tone is about 24 dB down from the peak power of the transmitter. This is a very inefficient system. In contrast, according to the teachings of the present application, Lincompex techniques may be used in such data transmission thereby dramatically increasing efficiency.

The problem associated with the transmission of such parallel-tone or multi-tone data using Lincompex techniques is best illustrated in FIGS. 2(b) and 3. FIG. 2(b) illustrates a situation where the band width of the data 10, the spectrum of tones of the parallel-tone or multi-tone data, overlaps the envelope signal generated by the Lincompex system. The compression process is accomplished by a circuit shown in FIG. 1(a). The circuit of FIG. 1(a) would accomplish the compression of the data signal represented in FIG. 2(b) by dividing the spectrum of the input signal by the overlapping spectrum of that signals envelope thereby creating undesirable singularities. These singularities make it impossible to recover the data. Thus, in the past, Lincompex techniques could not be used to compress data of the type exhibited in FIG. 2(b).

A similar problem is exhibited in FIG. 3. In FIG. 3, the data band width 10 has a frequency band between frequencies A and B. When this data is modulated, the modulated data spectrum 14 can increase to extend from A' to B'. Thus, while the data spectrum 10 and the envelope spectrum 12 do not, in and of themselves overlap, the modulated data spectrum overlaps the envelope spectrum again making data compression and recovery difficult when using Lincompex techniques.

FIG. 1 of the present application illustrates a Lincompex system similar to that illustrated in the '499 patent. In such a Lincompex system, voice information to be transmitted is introduced to an input 20 of the Lincompex system. A control tone generator or envelope circuit 24 monitors the input voice signal. An envelope detector 26 of the control tone generator (envelope circuit) 24 detects the envelope of the introduced voice signal and develops an envelope signal having a voltage representative of the signal level of the introduced voice signal. A compressor 22 compresses the introduced input voice signal. Compression is performed by dividing the signal by its envelope in pseudo-real time to produce a compressed voice signal. To develop the control tone, the system of FIG. 1 supplies the envelope signal developed from the output of the envelope detector 26 to a logarithmic (log) amplifier 28 which then develops a signal representative of the logarithm of the envelope signal. The output of this logarithmic amplifier 28 is supplied to a control terminal of a voltage control FM oscillator 30 which generates a frequency which varies about a center frequency $F_c$ in relation to the variation of the input voltage supplied to its control terminal from the logarithmic amplifier 28 to develop an envelope signal as an output of the control tone generator (envelope circuit) 24.

A summer 32 then sums the compressed voice signal developed at the output of the compressor 22 with the envelope signal developed at the output of the FM oscillator 30 to form a combined information signal.

In a speech transmission system, this summed waveform has a frequency band such as that illustrated in FIG. 2(a). A transmitter 34 is then input with the combined information signal produced by the summer 32 and transmits the signal over a desired transmission medium 36. In a typical embodiment, a single side band transmitter would normally transmit the modulated combined information signal across the airways in a known manner.

A conventional Lincompex demodulator is illustrated in FIG. 1(b). This demodulator receives the modulated combined information signal from the transmission medium 36a, which, once again, normally includes an antenna receiving radio waves from the atmosphere, and supplies the received modulated combined information signal to a receiver 38 which demodulates the transmitted signal to reproduce the combined information signal. Typically, this receiver would be a single side band receiver which mixes the received modulated combined information signal with the carrier frequency to produce a base band combined information signal. When transmitting voice, the combined information signal will exhibit the characteristics illustrated in FIG. 2(a).

To recover only the voice from such a combined information signal, a low pass filter 40 removes the envelope information 4 of FIG. 2(a) from the combined information signal to recover the compressed voice signal containing only the voice information 2. This compressed voice information is transmitted according to the Lincompex techniques at a substantially constant syllabic peak voltage which enables substantially complete modulation of the transmitter 34 of FIG. 1(a). This information must then be expanded to produce the necessary dynamic range for the recovered voice signal to be supplied at the output 52. Accordingly, an expander 42 is utilized which essentially multiplies the compressed voice signal developed at the output of low pass filter 40 by the envelope signal which is recovered by a control tone conversion circuit 44.

The control tone conversion circuit 44 comprises a band pass filter 46 which recovers only the envelope signal 4 of FIG. 2(a) from the combined information signal. This FM modulated envelope signal originally developed by the FM oscillator 30 of FIG. 1(a) is then frequency demodulated by a frequency demodulator 48 to recover the logarithm of the envelope. An antilogarithm amplifier 50 is then utilized to recover the original envelope developed by the envelope detector 26 of FIG. 1(a). This original envelope signal is then used to recover the original voice signal by expanding the compressed voice signal via the expander 42 to provide the original signal to the output 52.

As mentioned above, the conventional Lincompex techniques are best performed digitally according to the teachings of the Leveque '499 patent. While these techniques are successful for transmitting voice which is band limited and which exhibits an envelope having a frequency band which does not overlap the frequency band of the voice signal, such a system cannot be applied to signals which have overlapping information and envelope spectra.

A typical form for encoding data for transmission across a communications channel such as a radio link is the well known parallel-tone or multi-tone data encodation technique. In a multi-tone data encodation technique, a plurality of fixed or variable tonal frequencies are utilized to construct the overall data waveform. In FIG. 3, the unmodulated multi-tone data 10 extends in the frequency range of A-B. While, with proper frequency constraints, the envelope signal 12 of FIG. 3 might not overlap the data 10, itself, when modulated by one of the aforementioned techniques, the modulated data 14 exhibits an increased bandwidth of A'-B', the data frequency range 14 therefore overlapping the envelope frequency range 12. In such a case where the envelope and data frequency spectra overlap, it is not possible to utilize the prior art system of the '499 Leveque patent to modulate data due to the overlap between the envelope signal and data signal.

SUMMARY OF THE INVENTION

The above mentioned problem of utilizing known Lincompex techniques to transmit a complex waveform such as data not having constraints imposed upon its envelope is overcome by virtue of the concepts of the present application whereby any complex waveform digital data may be transmitted over a communication channel utilizing Lincompex techniques. According to the teachings of the present invention, either the overall data waveform, the control tone, or the compressed data signal is shifted in frequency to ensure adequate frequency separation between the frequency envelope of the modulated digital data and that of the control tone signal.

According to the teachings of one embodiment of the present invention, the introduced data waveform is heterodyned or modulated by an oscillation frequency $F_{osc}$ to raise the frequency spectra of the introduced digital information above that encountered by the control tone. In such a system, the frequency of the digital information signal may or may not be shifted back to base band after operation of the Lincompex system. Alternatively, the frequency modulation techniques may be performed on the envelope signal to frequency shift the envelope signal frequency spectra away from that of the compressed data signal or, may frequency shift the frequency spectra of the compressed data signal away from the spectra of the envelope signal, or both, or they may be processed as separate occupied spectra.

OBJECTS OF THE INVENTION

It is therefore an object of the present invention to employ Lincompex techniques to the transmission of parallel-tone or multi-tone encoded digital data;

It is another object of the present invention to enable the use of Lincompex techniques for transmission of any complex waveform;

It is a further object of the present invention to enable the utilization of digital Lincompex techniques to transmit complex data waveforms such as multi-tone or parallel-tone data over any communication channel such as an atmospheric radio link or a telephone line;

It is a still further object of the present invention to substantially increase the average power of transmission of a digital waveform such as parallel-tone or multi-tone data over a communication channel through the use of Lincompex techniques.

These and further objects of the present invention will become more readily apparent from a better understanding of the preferred embodiments described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein:

FIGS. 2(a) and 2(b) illustrate typical relationships between the frequency band of typical human voice and the modulated envelope of this voice and that which may be encountered by typical data and the frequency band of the data's envelope;

FIG. 3 illustrates the relationship of the frequency band of typical data to the frequency band of the data after modulation by a known technique and the envelope signal developed from such a data waveform;

FIGS. 4(a) and 4(b) illustrate the transmitter and receiver sections of one form of the preferred embodiment;

FIG. 5 illustrates an alternative embodiment of the transmitter portion of the present invention;

FIGS. 8(a)-8(f) graphically represent the frequency spectra of the signals processed in the transmitter portion of the present invention illustrated in FIG. 4 (a).

Figure 1A:
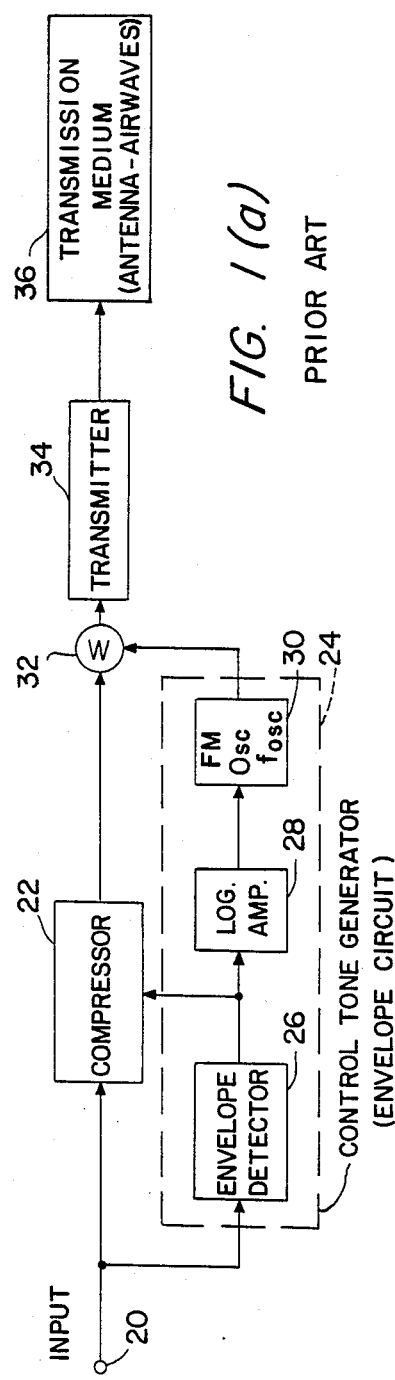
FIGS. 1(a) and 1(b) illustrate the transmitter and receiver sections of a prior art Lincompex system such as that described in the '499 Leveque patent.

The above mentioned drawings will be described in detail in the following detailed description.

DETAILED DESCRIPTION OF THE PREFERRED EMBODIMENT

The present invention will be described with reference to a general description of Lincompex techniques which may be implemented digitally or otherwise. However, the preferred embodiment contemplates the use of digital Lincompex techniques to practice the teachings of the present application. Accordingly, to the extent necessary, applicant hereby incorporates by reference the entirety of the disclosure of U.S. Pat. No. 4,271,499 entitled "Method and Apparatus for Digitally Implementing a Linked Compressor-Expander Telecommunications System" invented by the inventor of the present application.

FIGS. 4(a) and 4(b) illustrate collectively one embodiment of the present invention where the input signal is frequency shifted prior to the compression/expansion operation to enable transmission of a wideband complex waveform using Lincompex techniques. FIGS. 4(a) and 4(b) will be described with reference to the frequency spectra illustrated in FIGS. 9(a)-(f). In FIGS. 4(a) and 4(b), as in all of the figures of the present invention, like elements throughout the drawing figures are identified with like numbers.

Whereas the FIG. 1 prior art Lincompex system normally receives speech or voice at its input 20, the embodiment of FIG. 4 would normally receive a data input such as a 16-tone parallel-tone or multi-tone data signal as illustrated in FIG. 8(a) at its input 20. However, it should be understood that any complex data waveform including voice may be transmitted over a communications channel using the teachings of the present invention. A mixer 100 is provided to frequency shift the input data frequency spectra of FIG. 8(a) on FIG. 4(a), to a desired higher frequency $F_{osc}$ to ensure that no overlap between the input data band, when compressed, and the envelope signal frequency band occurs. Accordingly, an oscillator 102 supplies the mixing frequency $F_{osc}$ to a frequency multiplier or mixer 104 where it is mixed with the data input A of FIG. 8(a) to produce the mixed data B of FIG. 8(b). A filter 106 is then provided to band pass filter the mixed output to remove an undesired one of the two side bands produced by the mixing process. The frequency response of the filter 106 is illustrated in FIG. 8(c). After filtering, only a single side band is left which is frequency shifted to a desired frequency at the output D of the filter 106 as illustrated in FIG. 8(d). This frequency shifted data input of FIG. 8(d) is then treated by conventional Lincompex techniques by a compressor 22, envelope circuit 24, summer 32 and transmitter 34, in the manner described with respect to FIG. 1 to produce a combined data signal for transmission on the transmission medium 36. As explained previously, the compression operation enlarges the frequency spectrum of the compressed data to an enlarged frequency spectrum as shown in FIG. 8(f). The envelope circuit 24 generates an envelope spectrum E which would have a band width selected depending on various factors including the accuracy of compression to be achieved. However, it is important that the band width of the envelope spectrum not overlap that of the compressed data so that full compression and recovery of the data can be accomplished by the Lincompex system.

The transmission medium 36 utilized in the present invention may be any type of transmission medium, for example, an atmospheric radio wavelength, a telephone line, coaxial cable or fiberoptic cable, or any other path useable for the transmission of the selected complex waveform such as digital data.

Figure 1B:
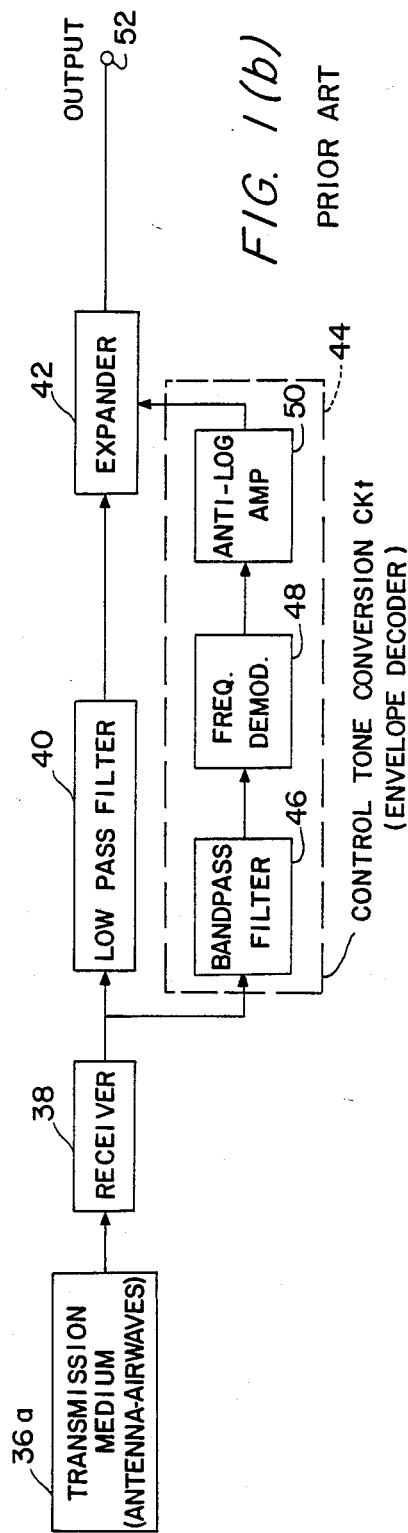

A receiver 38 is positioned at the other end of the transmission medium 36(a) as illustrated in FIG. 4(b) in a like manner to that of the prior art of FIG. 1(b). The modulated combined data signal is demodulated by the receiver 38 and a Lincompex expander LPXE including a low pass filter 40, expander 42, and envelope detector 44 recovers the frequency shifted data input first generated at point D of FIG. 4(a) as illustrated in FIG. 8(d) at the output of the expander 42. This frequency shifted data input, while not identical to the original data input signal delivered to the input 20 of FIG. 4(a) is nevertheless utilizable to recover the data contained therein. Accordingly, if desired, this frequency shifted data input may be provided via a line 118 to an output 152 where it may be detected by a detector 120 sensitive to the frequency shifted tones contained within the frequency shifted data input. Alternatively, a receiver mixer 110 including a multiplier 108, frequency oscillator 112 and filter 114 may be utilized to shift the frequency shifted data input back to its original frequency band as illustrated in FIG. 8(a) in a manner similar to the operation of the mixer 100 of FIG. 4(a). Accordingly, the digital information may be readily recovered according to the teachings of the present invention.

It should be noted that the frequency shifting performed according to the teachings of the present invention allows virtually any digitally encoded data to be transmitted utilizing Lincompex techniques. Thus, as described in the Background of the Invention section of the present invention, substantial improvement in average transmitter power may be derived, when compared to data transmission techniques not utilizing Lincompex.

FIG. 5 shows an alternative embodiment to the transmitter portion of an alternative Lincompex system produced according to the teachings of the present invention. In FIG. 5, a mixer 100 identical to that of FIG. 4(a)

is utilized to frequency shift the data input to a higher frequency F1. After compression of the frequency shifted data input utilizing compressor 22 and envelope circuit 24, the compressed data waveform is then mixed in mixer 200 with a second oscillator frequency $F_2$ produced by an oscillator 202. The oscillator frequency $F_2$ is multiplied with the compressed data signal produced at the output of the compressor 22 (corresponding to the frequency spectra of FIG. 8(f)) to frequency shift the compressed data signal to a different frequency range which is more convenient for modulation by the transmitter 34 in transmission via the transmission medium 36. The use of two oscillators separated from each other by the compressor and envelope circuit as in FIG. 5 allows for the placing of the control tone frequency below the compressed information spectrum to prevent overlap therebetween.

Figure 7:
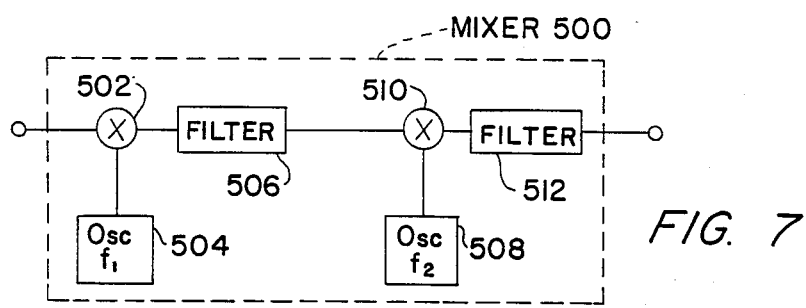
FIG. 7 illustrates an alternative embodiment of a mixer for use in the embodiments of the present invention.

The transmitted modulated combined data signal transmitted along the transmission medium 36 in FIG. 5 may be received by a circuit similar to that of FIG. 4(b), but having a slightly more sophisticated oscillator such as that illustrated in FIG. 7. The oscillator of FIG. 7 includes a first multiplier which multiplies the output of the expander 42 corresponding to the frequency shifted data input of FIG. 8(d) to the frequency spectra of the original data input as illustrated in FIG. 8(a). Thus, the mixer 500 of FIG. 7 includes a first multiplier 502 to multiply the frequency shifted data input of FIG. 8(d) with a first oscillator frequency $F_1$ developed by an oscillator 504. A filter 506 is then used to filter out the undesired side band. A second multiplier 510 then multiplies the partially frequency shifted data input with the oscillation frequency $F_2$ developed by oscillator 508 to return the data input to its original frequency spectra similarly to the base-band input to the modulator. A filter 512 is provided to filter the undesired side band and recover the original data input. The filter of FIG. 7 could alternatively be used in any of the preferred embodiments of the present invention.

Figure 6A:
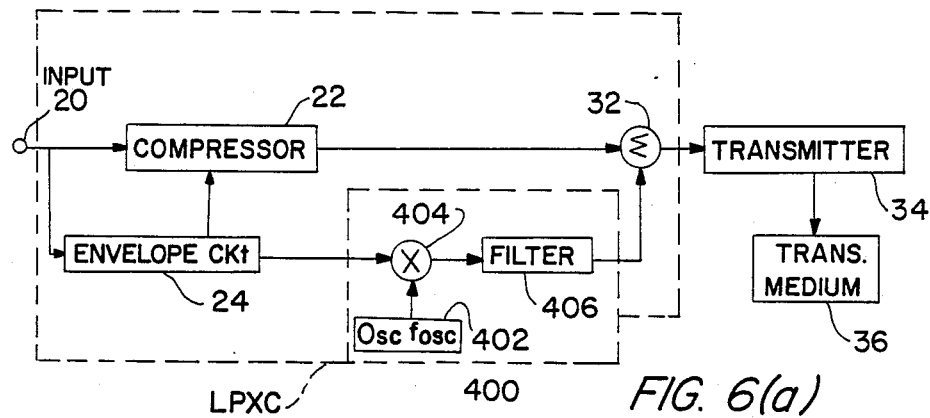
FIGS. 6(a) and 6(b) illustrate the transmitter and receiver portions of an alternative embodiment of the present invention.
Figure 6B:
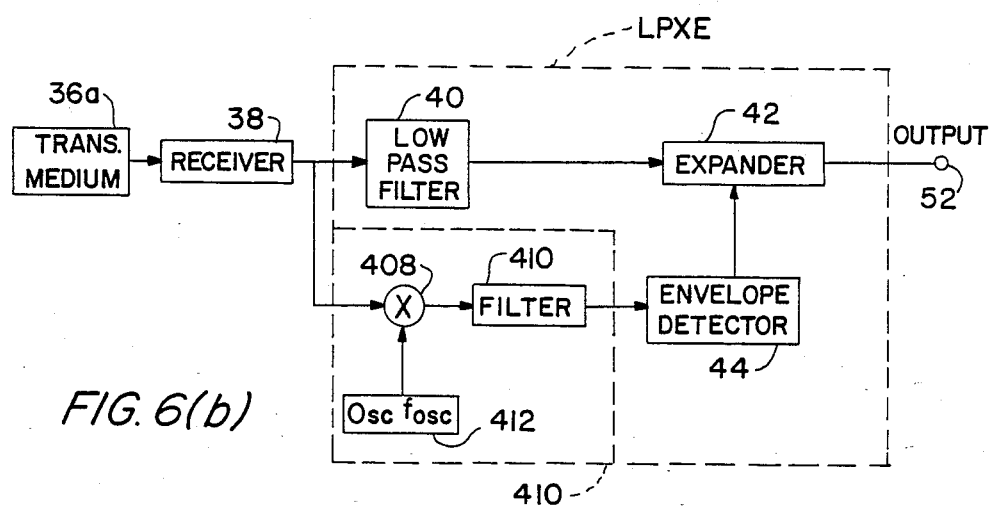

FIG. 6 illustrates still another alternative embodiment of the present invention where the envelope signal produced by the envelope circuit 24 at the output of the FM oscillator 30 of this envelope circuit 24 is frequency shifted by a mixer 400, otherwise similar to that utilized as mixer 100 in FIG. 4(a). The mixer 400 frequency shifts the envelope signal from its normal frequency range to a frequency range outside the frequency range of the compressed data signal (illustrated in FIG. 8(f)) so that the frequency spectra of the compressed data signal and the envelope signal do not overlap when summed by the summer 32. In this embodiment, when the receiver receives the modulated combined data signal and demodulates this signal to develop a combined data signal, the envelope signal is then again frequency shifted by mixer 410 back down to its original frequency spectra for use in the envelope circuit 24 in the conventional manner Thus, it is apparent that the teachings of the present invention enable one to shift the data signal, or envelope signal, to ensure that no overlap exists therebetween during the Lincompex operation.

As an alternative embodiment, frequency shifting may be performed on both the envelope and the signal or data. For example, the compressed signal may be shifted as in FIG. 5 and the envelope could be shifted as shown in FIG. 6, so long as their shifted frequencies do not then overlap.

As a further possible embodiment of the present invention, in the case of FIG. 3 where the unmodulated data and its envelope do not overlap, the compressed data signal developed by the compressor 22 may be frequency shifted as illustrated in FIG. 5 without the need to frequency shift the original data input using mixer 100 of FIG. 5. Accordingly, the compressed data output will be frequency shifted to a frequency band outside that of the envelope signal's frequency band and thus the necessary frequency separation may be maintained.

From the above described preferred embodiments, it is apparent that, contrary to accepted conventional beliefs, Lincompex techniques may be utilized to transmit any band-limited complex waveform including data which exhibits extremely large envelope bands such as commonly used multi-tone or parallel-tone data encodation while substantially improving the average power transmission of the transmitter and thus, the efficiency of transmission over the data channel. The frequency shifting operation necessary according to the teachings of the present invention may be performed either to the introduced digital data, the envelope compressed digital data, or the envelope signal itself However, it is important that the digital data signal after compression and envelope signal have frequency spectra which do not overlap so that a complete recovery of the input data may be obtained at the output of the receiver side expander From the above described embodiments of the present invention, it is apparent that the present invention may be modified as would occur to one of ordinary skill in the art without departing from the spirit and scope of the present invention which should be defined solely by the appended claims. Changes and modifications of the system contemplated by the present preferred embodiments will be apparent to one of ordinary skill in the art.

What is claimed:

1. A method of preparing any complex waveform for transmission over a communications channel comprising:
   (a) developing an envelope signal representative of the envelope of the complex waveform;
   (b) compressing said complex waveform in proportion to the level of said envelope signal to develop a compressed signal having a predetermined frequency band;
   (c) developing a control signal from said envelope signal, said control signal having a predetermined control tone band; and
   (d) shifting the center frequency of one of said predetermined frequency band and control tone band to prevent overlap therebetween.

2. The method of claim 1 wherein both said predetermined frequency band and control tone band are shifted by said step (d) of shifting.

3. The method of transmitting of claim 1 wherein said step (d) of shifting is performed by frequency shifting said complex waveform to a different frequency so that all frequencies in said predetermined frequency band are separated from any frequencies within said control tone band.

4. The method of transmitting of claim 1 wherein said step (d) of shifting is performed by frequency shifting said control signal to a different frequency so that all frequencies in said control tone band are separated from any frequencies within said predetermined frequency band.

5. The method of transmitting of claim 1 wherein said step (d) of shifting is performed by frequency shifting said compressed signal so that all frequencies in said predetermined frequency band are different from any frequencies within said control tone band.

6. The method of transmitting of claim 3 wherein said frequency shifting is performed by heterodyning.

7. The method of transmitting of claim 4 wherein said frequency shifting is performed by heterodyning.

8. The method of transmitting of claim 5 wherein said frequency shifting is performed by heterodyning.

9. The method of transmitting of claim 6 wherein said heterodyning is performed by multiplying said complex waveform by an oscillation frequency and filtering out the undesired side band formed by the multiplying.

10. The method of transmitting of claim 7 wherein said heterodyning is performed by multiplying said control signal by an oscillation frequency and filtering out the undesired side band formed thereby.

11. The method of transmitting of claim 8 wherein said heterodyning is performed by multiplying said compressed signal by an oscillation frequency and filtering out the side band having a band width which would otherwise overlap said control tone band.

12. The method of claim 1 wherein said envelope signal is a voltage related to the envelope of said complex waveform and wherein said step (c) of developing includes frequency modulating by generating a frequency which varies proportionately to the log of the voltage of said envelope signal.

13. The method of claim 1 further comprising: (e) transmitting said compressed signal and said control signal over a communication channel.

14. The method of claim 13 further comprising:
(f) receiving said compressed signal and said control signal from said communication channel;
(g) decoding said control signal to develop said envelope signal;
(h) compensating for said shifting of said step (d) to allow recovery of the complex waveform within said compressed signal; and
(i) expanding said compressed signal in proportion to the level of said envelope signal to recover said complex waveform.

15. The method of claim 3 further comprising: (e) transmitting said compressed signal and said control signal over a communication channel.

16. The method of claim 15 further comprising:
(f) receiving said compressed signal and said control signal from said communication channel;
(g) decoding said control signal to develop said envelope signal;
(h) expanding said compressed signal in proportion to the level of said envelope signal to recover said frequency shifted complex waveform; and
(i) detecting the data directly from said frequency shifted complex waveform by detecting at shifted frequencies.

17. The method of claim 4 further comprising: (e) transmitting said compressed signal and said control signal over a communication channel.

18. The method of claim 17 further comprising:
(f) receiving said compressed signal and said control signal from said communication channel;
(g) frequency shifting said control signal to its original control tone band center frequency;
(h) decoding said control signal to develop said envelope signal; and
(i) expanding said compressed signal in proportion to the level of said envelope signal to receive said complex signal.

19. The method of claim 5 further comprising: (e) transmitting said compressed signal and said control signal over a communication channel.

20. The method of claim 19 further comprising:
(f) receiving said compressed signal and said control segment from said communication channel;
(g) frequency shifting said compressed signal to its original data frequency band;
(h) decoding said control signal to develop said envelope signal; and
(i) expanding said compressed signal in proportion to the level of said envelope signal to receive said complex data signal.

21. The method of claim 1 wherein said complex waveform is parallel-tone or multi-tone data encoded on multiple frequencies.

22. The method of claim 21 wherein said complex waveform is encoded to form said complex data waveforms by amplitude-shift keying (ASK).

23. The method of claim 13 wherein said communication channel is a transmission frequency range within the atmosphere.

24. The method of claim 13 wherein said communication channel is a telephone line.

25. The method of claim 13 wherein said step of transmitting includes summing said compressed signal and said control signal.

26. The method of claim 25 wherein said step of transmitting includes modulating the sum of said compressed signal and control signal by a modulation technique selected from the group consisting of amplitude modulation (AM), single side band (SSB), double side band (DSB), vestigial side band (VSB) and frequency modulation (FM).

27. A system for preparing any complex waveform for transmission over a communication channel comprising:
envelope detection means for developing an envelope signal representative of the envelope of the complex waveform;
compression means for compressing said complex waveform into a compressed signal having a signal frequency band;
means for converting said envelope signal into a control tone signal having a frequency which varies with said envelope within a control tone band;
means for shifting the center frequency of one of said signal frequency band and said control tone band to prevent overlap therebetween.

28. The system of claim 27 wherein said means for converting frequency modulates a control tone within said envelope signal to develop said control tone signal.

29. The system of claim 27 wherein said means for shifting shifts the center frequency of both said signal frequency band and said control tone band to prevent overlap therebetween.

30. The system of claim 27 wherein said means for shifting frequency shifts said complex waveform to a different frequency so that all frequencies in said signal frequency band are separated from any frequencies within said control tone band.

31. The system of claim 27 wherein said means for shifting frequency shifts said constant signal to a different frequency so that all frequencies in said control tone band are separated from any frequencies within said signal frequency band.

32. The system of claim 27 wherein said means for shifting frequency shifts said compressed signal so that all frequencies in said signal frequency band are separated from any frequencies within said control tone band.

33. The system of claim 27 wherein said means for shifting the center frequency comprises a heterodyne frequency converter.

34. The system of claim 30 wherein said means for shifting the center frequency comprises a heterodyne frequency converter including,
an oscillator for developing a shift frequency,
a multiplex multiplying said complex waveform with said shift frequency to develop sum and difference frequencies, and
a filter removing the difference frequency to raise said signal frequency band.

35. The system of claim 31 wherein said means for shifting the center frequency comprises a heterodyne frequency converter including,
an oscillator for developing a shift frequency,
a multiplier multiplying said control signal with said shift frequency to develop sum and difference frequencies, and
a filter removing the difference frequency to raise said control tone band.

36. The system of claim 32 wherein said means for shifting the center frequency comprises a heterodyne frequency converter including,
an oscillator for developing a shift frequency,
a multiplier multiplying said compressed signal with said shift frequency to develop sum and difference frequencies, and
a filter removing one of the sum and difference frequencies to frequency shift said compressed signal.

37. The system of claim 27 further comprising transmitting means, receiving said compressed signal and said control tone signal, for transmitting said signals over a communications channel.

38. The system of claim 37 further comprising:
receiving means for receiving said signals from said communication channel.

39. The system of claim 38 further comprising:
decoder means, operatively connected to said receiver means, for decoding said control signal to develop said envelope signal;
data signal recovery means, operatively connected to said receiver means and said decoder means, for expanding said compressed signal in proportion to the level of said envelope signal; and
means for compensating for said shifting performed by said means for shifting to allow recovery of said complex waveform.

40. The system of claim 30 further comprising transmitting means, receiving said compressed signal and said control tone signal, for transmitting said signals over a communications channel.

41. The system of claim 40 further comprising:
receiver means for receiving said signals from said communication channel.

42. The system of claim 41 wherein said complex waveform signal contains digital data further comprising:
decoder means, operatively connected to said receiver means, for decoding said control signal to develop said envelope signal;
signal receiving means, operatively connected to said receiver means and said decoder means, for expanding said compressed signal in proportion to the level of said envelope signal to recover said frequency shifted complex waveform signal; and
means for detecting said digital data directly from said frequency shifted complex waveform by detecting said data at said shifted frequencies.

43. The system of claim 31 further comprising transmitting means, receiving said compressed signal and said control tone signal, for transmitting said signals over a communications channel.

44. The system of claim 43 further comprising: said communication channel.

45. The system of claim 44 further comprising:
mixer means for frequency shifting said control signal to its original control tone band;
decoder means, operatively connected to said receiver means, for decoding said control signal to develop said envelope signal; and
data signal recovery means, operatively connected to said receiver means and said decoder means, for expanding said compressed signal in proportion to the level of said envelope signal.

46. The system of claim 31 further comprising transmitting means, receiving said compressed signal and said control tone signal, for transmitting said signals over a communications channel.

47. The system of claim 46 further comprising:
receiver means for receiving said signals from said communication channel.

48. The system of claim 47 further comprising:
mixer means for frequency shifting said compressed signal to its original data frequency band;
decoder means, operatively connected to said receiver means, for decoding said control signal to develop said envelope signal; and
signal recovery means, operatively connected to said receiver means and said decoder means, for expanding said compressed signal in proportion to the level of said envelope signal.

49. The system of claim 27 wherein said complex waveform is parallel-tone or multi-tone data encoded on multiple frequencies.

50. The system of claim 49 wherein said data is encoded to form said complex data waveform by amplitude-shift keying (ASK).

51. The system of claim 37 wherein said communication channel is a transmission frequency range within the atmosphere.

52. The system of claim 37 wherein said communications channel is a telephone line.

53. The system of claim 37 wherein said transmitter means includes a summer for summing said compressed signal and said control signal.

54. The system of claim 53 wherein said transmitter means further includes a modulator for modulating the sum of said compressed signal and control signal by a modulator technique selected from the group consisting of amplitude modulation (AM), single side band (SSB), double side band (DSB), vestigial side band (VSB) and frequency modulation (FM).

55. A method of preparing any complex signal for transmission to a remote station comprising:
developing an envelope signal representative of the envelope of the complex signal;
compressing said complex signal into a compressed signal;

converting said envelope signal into a frequency modulated control signal having a control tone band; and separating said compressed signal and said control tone band of said control signal to avoid any overlap therebetween which would prevent recovery of the complex signal therefrom.

56. A system for preparing any complex signal for transmission to a remote station comprising:

envelope detection means for developing an envelope signal representative of the envelope of the complex signal;

compression means for compressing said complex signal to develop a compressed signal;

means for converting said envelope signal into a frequency modulated control signal having a predetermined control tone band; and separating said compressed signal and said control tone band of said control signal to avoid any overlap therebetween which would cause singularities.

* * * * *